April 26, 1955     J. A. JOHNSON     2,706,900
VALVE LOCK
Filed Dec. 8, 1952
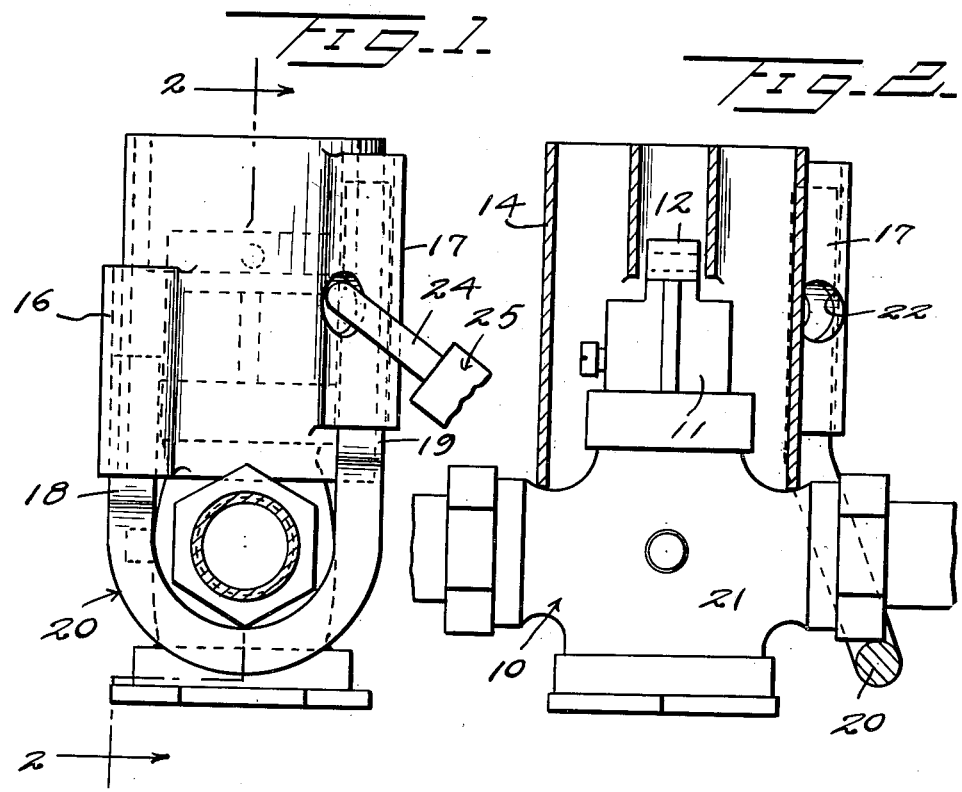
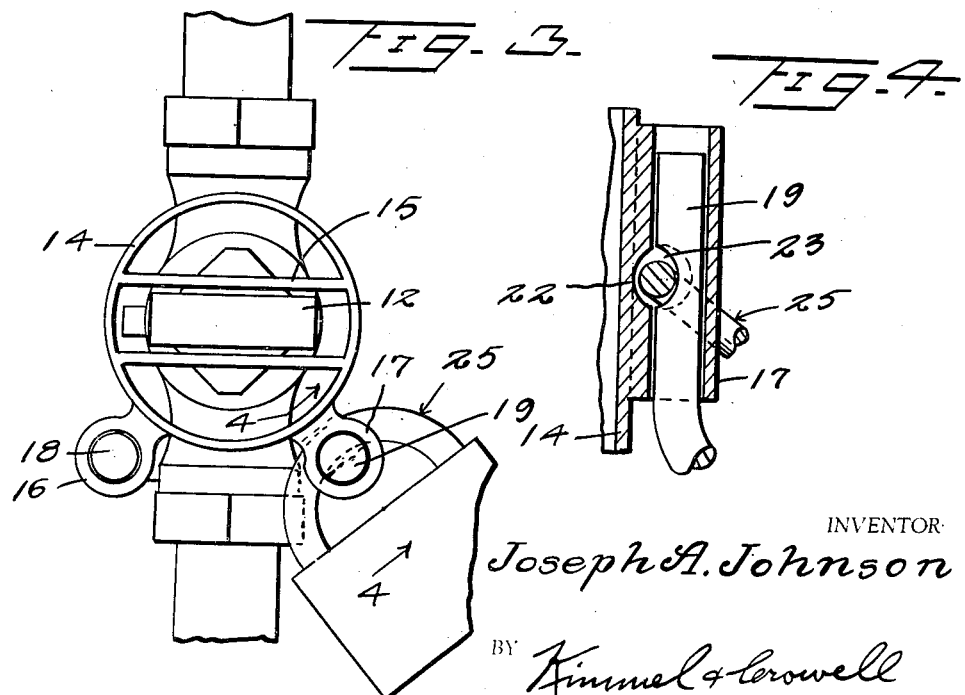
INVENTOR
Joseph A. Johnson
BY Kimmel & Crowell
ATTORNEYS

2,706,900

VALVE LOCK

Joseph Albert Johnson, Jacksonville, Fla., assignor to The City of Jacksonville, a municipal corporation of the State of Florida Application December 8, 1952, Serial No. 324,721

1 Claim. (Cl. 70—178)

This invention relates to a valve locking device, and is an improvement over the construction shown in Patent No. 1,920,128 issued July 25, 1933, for Locking Attachment.

In the locking attachment embodied in Patent 1,920,128 supra, the device is adapted to encompass the projecting valve stem or cap of a cut-off valve, but in this device the valve may be in either open or closed position, with the locking attachment thereon. This device is particularly designed to lock a water line in the closed position of the valve, but it has frequently happened that the valve was locked in the open position thereof rather than the closed position of the valve, so that the specific purpose for applying the device was defeated. It is, therefore, an object of this invention to provide a valve locking device which is so constructed and arranged that the device cannot be properly applied and locked unless the valve has been turned to closed position.

Another object of this invention is to provide a valve locking device which is simple in construction and can be applied readily to a cut-off valve for locking the valve in a closed position.

With the above and other objects in view, my invention consists in the arrangement, combination and details of construction disclosed in the drawing and specification, and then more particularly pointed out in the appended claim.

In the drawing—

Figure 1 is a detailed side elevation of a valve locking device constructed according to an embodiment of this invention, Figure 2 is a sectional view taken on the line 2—2 of Figure 1, Figure 3 is a plan view of the device, Figure 4 is a fragmentary vertical section through one of the keepers.

Referring to the drawing, the numeral 10 designates generally a conventional cut-off valve which has a cap 11 mounted on the stem thereof, and the cap 11 is formed with a rectangular or polygonal head 12. In the cut-off position of the valve 10 the head 12 is disposed transversely of the valve structure, as shown in Figure 3.

In order to provide a means whereby the valve plug will be held against turning when the plug is in a closed position, I have provided a cylindrical member 14 which encompasses the cap 11 and is provided with a pair of parallel plug locking bars 15 which loosely engage on opposite sides of the head 12. A pair of vertically disposed open ended keepers 16 and 17 are secured to and extend from the outer side of the cylindrical member 14 and are adapted to have the parallel arms 18 and 19 of a U-shaped locking bolt 20 loosely disposed therein. As shown in Figure 1, the keepers 16 and 17 are parallel with each other but are vertically offset with keeper 17 disposed in upwardly extended position with respect to keeper 16.

The bolt 20 is adapted to engage beneath one nipple 21 of the valve 10 and keeper 17 is provided at a point between the upper and lower ends thereof with a pair of aligned openings 22. The arm 19 of bolt 20 is formed with a notch 23 which in the locked position of bolt 20 is adapted to register with the openings 22.

The hasp 24 of a conventional lock 25 is adapted to extend through the openings 22 and engage in the notch 23 so that the bolt 20 will be held against downward movement relative to keepers 16 and 17.

In the use of the locking means the device can only be applied to the valve structure 10 when the valve stem head 12 is disposed in valve closing position, which is at right angles to the length of the valve structure. The cylindrical member 14 is extended over the cap 11, with head 12 loosely engaging between the parallel bars 15, whereupon the locking bolt 20 is extended below the nipple 21 of valve 10, with arms 18 and 19 inserted in keepers 16 and 17 respectively. Hasp 24 of lock 25 may then be extended through the keeper openings 22 and the notch 23. This device can be easily and quickly applied without the use of any tools and can also be readily removed by unlocking the lock 25.

With a device as hereinbefore described, the valve structure 10 must, in every instance, be in closed position so that when the device is applied the user will be assured that the valve is closed and cannot be opened until the device has been removed from the valve structure by unlocking lock 25.

I do not mean to confine myself to the exact details of construction herein disclosed, but claim all variations falling within the purview of the appended claim.

What I claim is:

In a valve construction including a cap secured to the valve stem and a polygonal head carried by the cap, means for locking the valve in closed position, said means comprising a cylindrical member open at both ends adapted to encompass said cap, a pair of parallel bars positioned adjacent one end and extending between the walls of said cylindrical member and adapted to engage on opposite parallel sides of said head in the closed position of the valve, a pair of tubular keepers fixed in parallel relation to the outer side of said member, a U-shaped bolt engageable about a portion of the valve, said bolt having angularly offset parallel cylindrical ends projecting into said keepers, one of said keepers having a pair of alined openings therethrough and a notch interiorly thereof, said bolt having a notch in one parallel end thereof adapted to register with said openings and said first mentioned notch, and a locking element engaging through said openings and said notches.

References Cited in the file of this patent

UNITED STATES PATENTS

| 1,541,801 | Durning | June 16, 1925 |
| 1,920,128 | Mickler | July 25, 1933 |
| 2,094,773 | Cohick | Oct. 5, 1937 |